United States Patent [19]

Holloway, Jr. et al.

[11] 4,329,375

[45] May 11, 1982

[54] LOW-FAT NUTS WITH IMPROVED NATURAL FLAVOR

[75] Inventors: Oris E. Holloway, Jr.; Howard Wilkins, both of Brookfield, Conn.

[73] Assignee: Nabisco Brands, Inc., New York, N.Y.

[21] Appl. No.: 198,986

[22] Filed: Oct. 21, 1980

[51] Int. Cl.³ .............................................. A23L 1/36
[52] U.S. Cl. .................... 426/632; 426/417; 426/455; 426/466; 426/506
[58] Field of Search .............. 426/632, 460, 507, 438, 426/93, 417, 804, 466

[56] References Cited

U.S. PATENT DOCUMENTS 3,294,549 12/1966 Vix et al. ............................. 426/632

Primary Examiner—Raymond N. Jones
Assistant Examiner—George C. Yeung
Attorney, Agent, or Firm—Richard Kornutik

[57] ABSTRACT

Disclosed is an improved process for preparing low-fat nuts, such as peanuts. The resulting products retain more of their natural flavor than products prepared according to prior art procedures. According to the process, the nuts are initially roasted at a temperature and for a time effective to develop a roasted flavor and color prior to pressing them to remove only a limited amount of the oil. After the initial roasting, the nuts are hydrated and equilibrated for a period of time to obtain a uniform moisture content within the range of from about 4 to 8%. The hydrated nuts are then pressed to remove from about 20 to about 55% of the oil and then hydrated to a moisture content sufficient to cause the nuts to regain approximately their normal shape prior to a final roasting to fully develop the flavor and color of the nuts.

21 Claims, No Drawings

LOW-FAT NUTS WITH IMPROVED NATURAL FLAVOR

BACKGROUND OF THE INVENTION

The present invention relates to nuts, and particularly to an improved process for preparing defatted nuts to retain a greater proportion of their natural flavor.

The term "nuts" as used in this description includes whole nuts and pieces of nuts such as peanuts, almonds, Brazil nuts, filberts, pecans, walnuts, and the like. For purposes of conciseness in description, the following disclosure will center around the production of low-fat peanuts. It is not intended, however, to be limited to peanuts because the principles which will apply for peanuts should apply to other nuts.

The basic procedures for preparing partially-defatted nuts have been known for a number of years. For example, in U.S. Pat. Nos. 2,003,415 to Ammann and 3,294,549 to Vix et al, there are described procedures for pressing the oil from nuts such as peanuts. Broadly, these methods include the steps of pressing nuts until the desired quantity of oil is removed, and then steaming or cooking the partially-defatted nuts in water until the nuts are reconstituted to substantially their original size and shape. Both of these patents discuss the virtues of partially defatted nuts in the diet.

In U.S. Pat. No. 3,294,549, Vix et al indicate that the resulting high protein products have excellent flavor, aroma, taste, texture, and appearance, and good shelf life. They indicate that their process can be performed on raw, toasted, blanched or unblanched nuts with equivalent results; however, no example is directed to toasted nuts and there is no teaching or suggestion that pretoasted nuts, when properly processed, will be more flavorful. In fact, the various rehydration and drying procedures taught would negate any flavor benefit due to toasting prior to pressing. Further work on the Vix et al process is described in a series of articles entitled "Development and Potential of Partially Defatted Peanuts," *Peanut Journal and Nut World*, January and February 1967, and an article entitled "Low Calorie Peanuts", *Food Processing/Marketing*, September 1965.

Later workers, encouraged by the apparent appeal of products of that type to weight conscious consumers, continued to work in this area. Because the caloric density of fat is twice that of protein and carbohydrates, the removal of such a significant amount of fat from nut products could result in significant calorie reductions. Moreover, because these products were typically less dense than the normally treated non-defatted nuts, yet further calorie reductions were obtainable. In U.S. Pat. No. 3,645,752 to Baxley, there is disclosed a process which is said to improve the flavor of partially-defatted nuts by quenching them in a flavored oil after roasting. In U.S. Pat. No. 3,740,236, also to Baxley, it is indicated that the roasted peanut flavor appears to be reduced in proportion to the percentage of the peanut oil removed during the pressing process. Baxley, however, does not directly confront this flavor loss but provides a process for improving flavor of the nuts once the flavor is diminished. According to this patent, the defatted nuts are reconstituted in an aqueous binder solution which can also contain flavors.

Gannis et al, in U.S. Pat. No. 4,049,833, also recognized the adverse effect on the flavor and texture of partially-defatted nuts. To correct this, Gannis et al suggested contacting the partially-defatted nuts with a glycerol-containing solution during reconstitution, prior to roasting. They disclosed that after roasting, the treated nuts have improved flavor, texture and storage stability.

The exact reason for the flavor loss in the partially-defatted nuts is not fully understood. The Doctoral Dissertation of M. E. Mason entitled *Procedures in Studying and Factors Influencing the Quality and Flavor of Roasted Peanuts*, Oklahoma State University, 1963, pages 63 and 64, indicates that oil pressed from peanuts contain aleurone grains, among other particulates, which appear to contain flavor precursors. The Mason dissertation, however, was not concerned with the preparation of low-fat nuts, but simply gaining a better knowledge of the source and identification of flavor principals in peanuts.

Thus, while the prior art offers considerable promise to the producers and consumers of peanut and other nut products, by holding out opportunity for partially-defatted nut products, the prior art has not yet been able to produce a high quality product of this type. Flavor and texture problems remain. Particular problems persist in the assurance of natural nut flavor, without the need to cover up the lack of it by means of added flavorings and the like.

SUMMARY OF THE INVENTION

Accordingly, it is an object of the present invention to provide an improved process for preparing partially-defatted nuts.

It is yet another object of the present invention to provide an improved process for preparing partially-defatted nuts which retain a greater degree of the natural nut flavor.

It is a yet further object of the present invention to provide an improved process for preparing partially-defatted nuts which have an overall combination of texture, flavor, and mouthfeel which more closely resembles nut products containing their natural oil content.

It is yet another and more specific object of the present invention to provide an improved process for preparing partially-defatted peanuts which provide a satisfying combination of peanut flavor, texture, and mouthfeel in a peanut product which also offers a significant reduction in caloric intake.

These and other objects are accomplished according to the present invention which provides an improved process for preparing reduced calorie roasted nuts while reducing the loss of natural roasted flavor, and the product of that process. The process comprises roasting nuts at a temperature and for a time effective to develop a roasted nut flavor and color; hydrating the roasted nuts to obtain a uniform moisture content within the range of from about 4 to about 8% based on the weight of the nuts; pressing the nuts under conditions effective to remove from about 20 to 55% of the oil content of the nuts; hydrating nuts to a moisture content sufficient to cause the nuts to regain approximately their normal shape; and roasting the nuts to fully develop the flavor and color thereof.

DETAILED DESCRIPTION OF THE INVENTION

The present invention enables the production of partially-defatted nuts of all varieties while retaining a greater degree of their natural flavor and aroma. The nuts can be blanched or unblanched as desired. Similarly, the nuts can be whole or split depending upon the desired end-use.

It has been determined according to the present invention that more of the natural peanut or other nut flavor can be retained within the nut if the nut is subjected to an initial roasting operation which is effective to develop a roasted nut flavor and color, and if the degree of oil extraction from the nuts is limited to less than about 55% oil extraction. While the prior art has suggested broadly the possibility of defatting partially-roasted nuts, it has not suggested either roasting them to the extent that they develop the roasted flavor and color or that doing so would improve the flavor of the final product.

Moreover, while the prior art has suggested that the degree of flavor loss in defatted peanuts is generally proportional to the amount of oil extracted, it has been found, according to the present invention, that by moderately reducing the degree of oil extraction to from about 20 to about 55% of the initial oil content of the nut, in combination with pre-roasting, it is possible to obtain a product which offers a significant calorie reduction while yet providing a degree of flavor which is greater than might be expected.

This unexpected degree of flavor retention is achieved according to the present invention with reduced breakage from what would be obtained by following the prior art procedure. According to the present invention, it has been found that the initially roasted nuts are too fragile to withstand the rigors of pressing even when adjusted to the moisture content range of from 3 to 8% as is suggested in the prior art, unless the nuts are equilibrated to uniformly distribute the moisture throughout the nuts.

It has also been discovered, unexpectedly, that the initial roasting step somehow controls the final size of the product after final processing. Ordinarily, the defatted nuts tend to be larger after processing than they were to start. Advantageously, however, the original size and shape of the nuts can be more closely achieved by the present invention. While not wanting to be bound by any theory, it is speculated that the protein is partially denatured and set to the original size. Also, this size control is believed to play some role in rentention of flavor precursors which are developed into flavor after pressing in the final roasting.

Another advantage of the present invention is that it permits the extraction of oil from split nuts at greater rates than previously thought possible. Where blanched peanuts were processed by prior art methods, it was difficult to obtain effective extraction from lots containing only 20 to 30% splits. When the process of the present invention is employed, good results can be achieved employing a major proportion, typically 60 to 70%, split peanuts.

According to a preferred aspect of the invention, further flavor improvement is achieved by minimizing the amount of water employed to rehydrate the nuts after pressing. Where the amount of water is minimized, less of the flavors are stripped off by the water which is vaporized during subsequent drying and final roasting. Moreover, the use of less water to rehydrate results in less loss of soluble solids, much of which are flavors or flavor precursors.

These major improvements permit the production of partially defatted nuts of improved quality. Further details of processing are described below which provide further improvements according to the invention.

Nuts, such as peanuts, are subjected to an initial roasting operation before or after decorticating or blanching. It is preferred, however, to remove the nut shell, i.e., decorticate, prior to the roasting operation, simply to save energy. Also, where roasting in oil is desired, the outer shell will further cause losses of oil. Blanching, i.e., removing the skin, is preferred in some respects and is less preferred in others. For example, where red skin peanuts are to be air roasted, it is preferred to leave the skins on until after the initial roasting operation. This is believed to improve flavor. However, where the initial roast is to be done by oil roasting, it is usually preferred to blanch prior to roasting.

Initial roasting will be conducted for a period of time and at a temperature effective to develop a roasted nut flavor and color. Typically, this will require roasting at a temperature of from about 120° C. to about 175° C. For air roasting the time will typically be in the range of from about 10 to about 60 minutes. Oil roasting times will be shorter. Preferably, this initial roasting operation will be done in air at a temperature of from about 135° C. to about 165° C. for a period of from about 12 to about 30 minutes. The roasting should be as rapid as possible consistent with maintenance of a moderate temperature. Where long roast times are employed, flavor is lost by volatilization. Where temperatures are too intense, flavors are also volatilized too rapidly. Presently, air roasting at about 143° C. for about 15 minutes appears optimum.

In addition to developing the flavor and the color of the nut, this initial roast also partially denatures the protein and reduces the moisture content, typically to a level of less than about 3%. The most preferred results have been achieved where the initial roasting step is permitted to develop the roasted nut flavor and color until the moisture content is decreased to at least about 2%. It is possible to roast to even lower moisture contents; however, caution must be exercised so that the roast does not excessively denature the proteinaceous and other materials giving body and structure to the nut. Where excessive roasting results, the nuts become too brittle to survive the pressing operation without excessive breakage. In the case of blanched peanuts, it has been possible to establish a colorimetric standard to determine the desired end-point for roasting. According to this procedure, an Agtron color photometer is employed in the green mode using the 12 and 90% plates to define the scale. With this as a standard, reflectance values of from about 25 to about 40, typically about 33, are believed to be about optimum in terms of flavor and overall physical characteristics of the product nuts.

After the initial roasting, the moisture content must be uniformly increased to a level more suitable for pressing. Hydration to a moisture content of from about 4 to about 8%, preferably up to about 5.5%, and most preferably about 5%, can be achieved in any suitable manner. For example, the nuts can be contacted with heated or unheated water for a period of time effective to achieve the desired degree of hydration. Further, the nuts can be steamed or heated in pressurized water. The exact technique is not critical to the present invention. What is critical, is that the nuts, once hydrated, be equilibrated to achieve a substantially uniform moisture content throughout their individual cross sections. Where this is not achieved with the partially roasted nuts according to the present invention, an excessive degree of breakage will occur during the subsequent pressing to extract the oil from the nuts. However, it is preferred to add the moisture as quickly as possible to avoid leaching of soluble materials. Also, care should be taken to go directly to the desired moisture without surpassing it because drying with heat will strip flavors produced in the initial roasting step.

Hydration can be accomplished by contacting the nuts with heated or unheated water, such as by immersion or spray. Water temperatures of ambient and slightly above are typical, with ambient temperatures being preferred. While the exact manner of achieving hydration is not as important as the degree and uniformity thereof, spraying with ambient water—just sufficiently to wet the nuts—is preferred. Equilibrium can be achieved in the case where the nuts have been contacted with hot water, by simply wetting them and then letting stand out of the water for a sufficient period prior to pressing to allow the moisture to migrate uniformly throughout the nuts. In the case of redskin Virginia peanuts, this can be accomplished by permitting them to stand for about 2 or more hours. Good results have been achieved by permitting the peanuts to stand for about 4 hours or more.

The uniformly-hydrated peanuts are then pressed according to any technique which is suitable for extracting from about 20 to about 55% of the initial oil content of the nut. This can be achieved, for example, by employing a Carver press at applied pressures of greater than about 1000 psig for from about 15 to about 120 minutes. While the exact times and pressures for oil extraction can be varied as desired to obtain the desired degree and rate of extraction, pressures of less than about 1500 psig, preferably about 1200 psig, are preferred. The pressure is preferably brought up to the desired level as quickly as possible. It should be remembered, however, that while pressures much higher than this range will provide more rapid extraction of the oil, they may also cause more physical damage to the peanuts with a possible reduction in the amount of the natural flavors retained therein. Similarly, while pressures lower than this particular range may be employed with somewhat less breakage of the nuts, the time required for extraction of the desired amount of oil will be increased. A desirable balance between calorie reduction and final product flavor and texture can be achieved with oil reductions of between 35 and 45% where processing is accomplished according to the present invention.

The nuts are flattened and undesirably dense after the pressing operation and must be treated, such as by hydration, to return them to approximately their natural shape. It is an unexpected advantage of the process of the invention that the nuts can be returned to approximately their original size and shape. This is in sharp contrast to prior art procedures where the product nuts will generally become substantially larger and lighter than the starting nuts. It is desired to obtain bulk densities of less than about 0.40 grams per cubic centimeter, and most desirably within the range of from about 0.32 to 0.39 grams per cubic centimeter. Products having these bulk densities offer significant calorie reductions on a volume basis while still retaining a nut-like crunch and chew when processed according to the invention. These bulk densities are determined by filling a 500 cubic centimeter graduated cylinder with nuts, determining the weight of the nuts, and dividing the weight in grams by the volume in cubic centimeter.

The distorted, partially-defatted nuts are preferably hydrated by contacting them with heated water, typically at a temperature of above about 50° C., preferably from about 60° C. to 75° C., for a period of time sufficient to cause the nuts to regain approximately their normal shape. Typically, moisture contents of less than 30%, preferably less than 25%, and most preferably from about 10 to about 15%, based upon the total weight of the re-hydrated nuts, will be effective. Limiting the water content during this stage in processing minimizes the removal of flavors developed during the initial roast. Moreover, it decreases the chance that flavor precursors will be leached by the rehydration medium, and the loss of flavors developed during final roasting by a mechanism thought to be akin to steam distillation where the escaping steam carries off the volatile flavors. The water can be contacted by immersion or spraying, with spraying being preferred. The water can contain any suitable texturizing or flavoring additives as may be desired.

The re-hydrated, partially-defatted nuts must be dried and roasted to obtain the final roasted nut product. Roasting and drying can be accomplished in any suitable manner. Typically, the art recognized techniques of dry roasting and oil roasting are effective to achieve the desired degree of flavor and color development while at the same time drying the nuts to a moisture content which is effectively low to provide the desired crunch and chew properties. Typical roasting temperatures of from about 120° C. to about 185° C., preferably from about 135° C. to about 175° C. can be employed. Typical oil roasting times will be within the range of from about 2 to about 10 minutes, and more preferably will be within the narrower range of from about 4 to about 6 minutes. One preferred set of conditions involves roasting at 165° C. for 4.5 minutes. The final roasting step should be sufficient in intensity and duration to achieve the optimum flavor and color development desired for the particular product end-use. As in the case of the initial roasting operation, the moisture content will most usually be reduced to a level of less than about 3% and preferably is reduced to a level of at least 2% or less, most preferably about 1.5%. Again here, in the case of blanched peanuts, the Agtron color photometer can be employed to standardize the degree of roast. In one typical operation, the device is employed in the green mode with 12 and 33% plates defining the scale on which a reading of from about 75 to about 95 is preferred. Most preferably, the reading will be within the range of from 80 to 90.

When the desired degree of roast is achieved, it is important to reduce the temperature of the nuts rapidly so that they do not become badly over-roasted or burned. This can be accomplished by dumping them rapidly from the roasting apparatus and flushing them with a stream of ambient air. Where the nuts are allowed to drop from the roasting apparatus for a significant fall and are spread uniformly on an open mesh conveyor, it is usually not necessary to overtly blow air onto the hot nuts to achieve cooling.

After the roasting operation, and preferably after cooling, the nuts can be coated with various flavoring agents, allspice, cinnamon, clove, carroway, bay, sage, ginger, basil, and the like, which can be employed alone or with condiments such as salt, pepper, monosodium glutamate, and the like; texturizers such as glycerine; and binders such as natural gums, dextrins, gelatin, sugars, and the like. Where the nuts are dry roasted, a portion or all of the added materials can be introduced prior to completion of the roasting operation.

The following examples are presented for the purpose of further illustrating and explaining the present invention and are not to be taken as limiting in any regard. Unless otherwise indicated, all parts and percentages are by weight, and are based on the total weight of the product at that particular stage in processing.

EXAMPLE 1

This example illustrates the production of partially-defatted roasted peanuts according to the present invention.

Raw redskin Virginia extra large peanuts (5.6% water) are pre-roasted in a forced draft oven at 149° C. for 15 minutes to develop flavor and color in the nut prior to pressing. The roasted nuts have a moisture content of approximately 2% upon removal and spreading out to cool to room temperature. The nuts are then blanched by means of a whole nut blancher, color sorted, and tested on an Agtron color photometer in the green mode employing the 12 and 90% plates. The peanuts exhibit a reading of about 33. After blanching, the peanuts are immersed in water maintained at 91° C. for 30 seconds and are then removed and equilibrated for about 4 hours. After the period of equilibration, the nuts are placed in a Carver press and pressed at 1500 psig for about 20 minutes. The pressure starts at a value of about 1000 psig and is gradually raised to the final pressure over the period of pressing. Pressing under these conditions removes about 40% of the original oil content of the peanuts. The partially-defatted nuts are then immersed in hot water at 91° C. for about 2.5 minutes. The peanuts at this point in processing contain about 25% moisture. The re-hydrated peanuts are then drained and immersed in vegetable oil maintained at 165° C. for about 5.5 minutes to achieve the final roast which indicates a 90 reading on the Agtron color photometer employed in the green mode with the scale defined by the 12 and 33% plates. This product exhibits a bulk density of about 0.34 grams per cubic centimeter and has an acceptable appearance, in terms of the number of cracks, and has good texture and good flavor. As a comparison, the above procedure is repeated except that the peanuts are pressed immediately after removal from the hydration bath and not given time to equilibrate. The nuts produced according to this procedure also have good flavor but are more tender and contain more cracked nuts.

EXAMPLE 2

This example presents a comparison of partially-defatted roasted nut products to show the relationship between flavor and degree of extraction for products involving an initial flavor-developing roasting step and nuts not so treated. In the table which follows, the pre-roasted nuts having 25%, 40% and 55% of their initial oil content extracted fall within the scope of the present invention. The product prepared from pre-roasted nuts having 70% oil extraction, and those products prepared from raw nuts at all four oil levels were not prepared according to the present invention. The samples are prepared in general accordance with the procedure set forth in Example 1 differing only in the degrees of oil extraction set forth in the table and the fact that the "Raw nuts" comparison samples are made from peanuts not roasted prior to pressing. A panel of 48 tasters were given paired comparisons of pre-roasted nuts and raw nuts for each of the degrees of oil extraction. Results are shown in the following table, where NS means no statistically significant results were achieved and PREF and LOSS indicate statistically significant preferences and losses, respectively, with a confidence level of 90%.

FLAVOR vs. DEGREE OF EXTRACTION

| Product | Degree of Oil Extraction | | | |
|---|---|---|---|---|
| | 25% | 40% | 55% | 70% |
| Pre-roasted nuts | NS | PREF | NS | NS |
| Raw nuts | NS | LOSS | NS | NS |

It can be seen from the above table that the product having 40% oil extraction prepared according to the invention is better than the prior art products. The other results are not reliable statistically at this confidence level.

EXAMPLE 3

This example employs the same process as Example 1, differing in that the initial roast is done at 138° C. for 30 minutes to achieve an Agtron color photomer reading of 32.5 on the same scale, and the initially roasted peanuts are hydrated by immersion for 30 seconds in 90° C. water, draining for 1 minute and equilibrating at 21° C. for 18 hours. Samples prepared in this manner according to the invention (Preroasted/dip/equil) were tested for ability to express oil and the percentage of nuts broken, and compared to two samples, not in accordance with the invention, prepared by pressing pre-roasted nuts without hydrating (as is) and dipped in water alone without equilibrating (Preroasted/dip). The results are as follows:

| | PRESSING | | |
|---|---|---|---|
| Sample | Time to Remove Oil (Minutes) | $Psig_{Initial}$ Oil Flow | $Psig_{Maximum}$ Oil Removed |
| Preroasted/as is | 22 | 730 | 1250 |
| Psreroasted/dip | 120 | 832 | 1560 |
| Preroasted/dip/equil | 12 | 400 | 780 |

| | BREAKAGE | |
|---|---|---|
| Sample | % Broken + Fines | % Acceptable |
| Preroasted/as is | 89.5 | 10.5 |
| Preroasted/dip | 18.9 | 81.1 |
| Preroasted/dip/equil | 7.4 | 92.6 |

The above description is presented for the purpose of teaching the person of ordinary skill in the art how to make and use the invention. It is not intended to detail all those obvious modifications and variations of the invention which will become apparent to the skilled worker upon reading the description. It is intended, however, that all such obvious modifications and variations be included within the scope of invention which is defined in the following claims.

What is claimed is:

1. A process for preparing reduced calorie roasted nuts while reducing the loss of natural roasted flavor, which comprises: roasting nuts at a temperature and for a time effective to develop a roasted nut flavor and color; hydrating the roasted nuts; equilibrating the hydrated nuts for a period of time to achieve a substantially uniform moisture content throughout their individual cross sections, within the range of from about 4 to about 8%, based on the weight of the nuts; pressing the nuts under conditions effective to remove from about 20 to about 55% of the oil content of the nuts; hydrating the nuts to a moisture content sufficient to cause the nuts to regain approximately their normal shape; and roasting the nuts to fully develop the flavor and color thereof.

2. A process according to claim 1 wherein the initial roasting is done by air roasting at a temperature of from about 135° C. to 175° C. for a time of from about 10 to 60 minutes.

3. A process according to claim 2 wherein the moisture content of the nuts is reduced to about 2% or less by the initial roasting.

4. A process according to either of claims 2 or 3 wherein the nuts are peanuts and initial roasting is continued until the color reaches a value of from 25 to 40 as measured by an Agtron color photometer employing the 12 and 90% plates in the green mode.

5. A process according to claim 1 wherein the steps of hydrating and equilibrating the nuts after the initial roasting step and prior to pressing, comprise contacting the nuts with water, removing the nuts from contact with the water, and then permitting the moisture gained to become uniformly distributed throughout the nuts for at least 2 hours prior to pressing.

6. A process according to claim 5 wherein the the nuts are hydrated to a moisture content of from about 4.0 to about 5.5% based on the total weight of the nuts.

7. A process according to claim 6 wherein the nuts are immersed in the water.

8. A process according to claim 6 wherein the nuts are sprayed with the water.

9. A process according to claim 6 wherein the moisture is permitted to become uniformly distributed for a period of at least 4 hours prior to pressing.

10. A process according to claim 1 wherein the nuts are peanuts which are blanched prior to pressing.

11. A process according to claim 1 wherein the nuts are pressed at a pressure of greater than about 1000 psig.

12. A process according to either of claims 1 or 11 wherein the nuts are pressed to remove from about 35 to about 45% of the oil.

13. A process according to claim 1 wherein the nuts are peanuts and comprise a major proportion of split nuts.

14. A process according to claim 1 wherein the nuts are hydrated after pressing by contacting them with water at a temperature of above about 50° C. for a period of time sufficient for the nuts to approximately regain their initial shape and size.

15. A process according to claim 14 wherein the nuts are peanuts and are hydrated to a moisture content within the range of from about 10 to about 25% based on the total weight of the re-hydrated peanuts.

16. A process according to claim 15 wherein the nuts are rehydrated to a moisture content within the range of from about 10 to about 15%.

17. A process according to claim 1 wherein the nuts are oil roasted after re-hydration to a moisture content sufficient to cause the nuts to regain approximately their normal shape, by heating to a temperature within the range of from about 120° C. to about 175° C. for a period of from about 2 to 10 minutes.

18. A process according to claim 17 wherein the roasting is done at a temperature of from about 135° C. to 170° C. for a period of time of from about 4 to 6 minutes to a moisture content of less than about 2%.

19. A process according to claim 18 wherein the moisture content of the nuts is reduced to about 1.5%.

20. A process according to claim 17 wherein the nuts are peanuts and the second roasting is continued until the color reaches a value of from about 75 to 95 as measured by an Agtron color photometer employing the 12 and 33% plates in the green mode.

21. A product prepared according to the process of claim 1.

* * * * *